Jan. 6, 1959
H. T. HUNTER ET AL
2,867,162
APPARATUS FOR PRODUCTION OF COOKED PRODUCTS
Filed Jan. 25, 1957
4 Sheets-Sheet 1
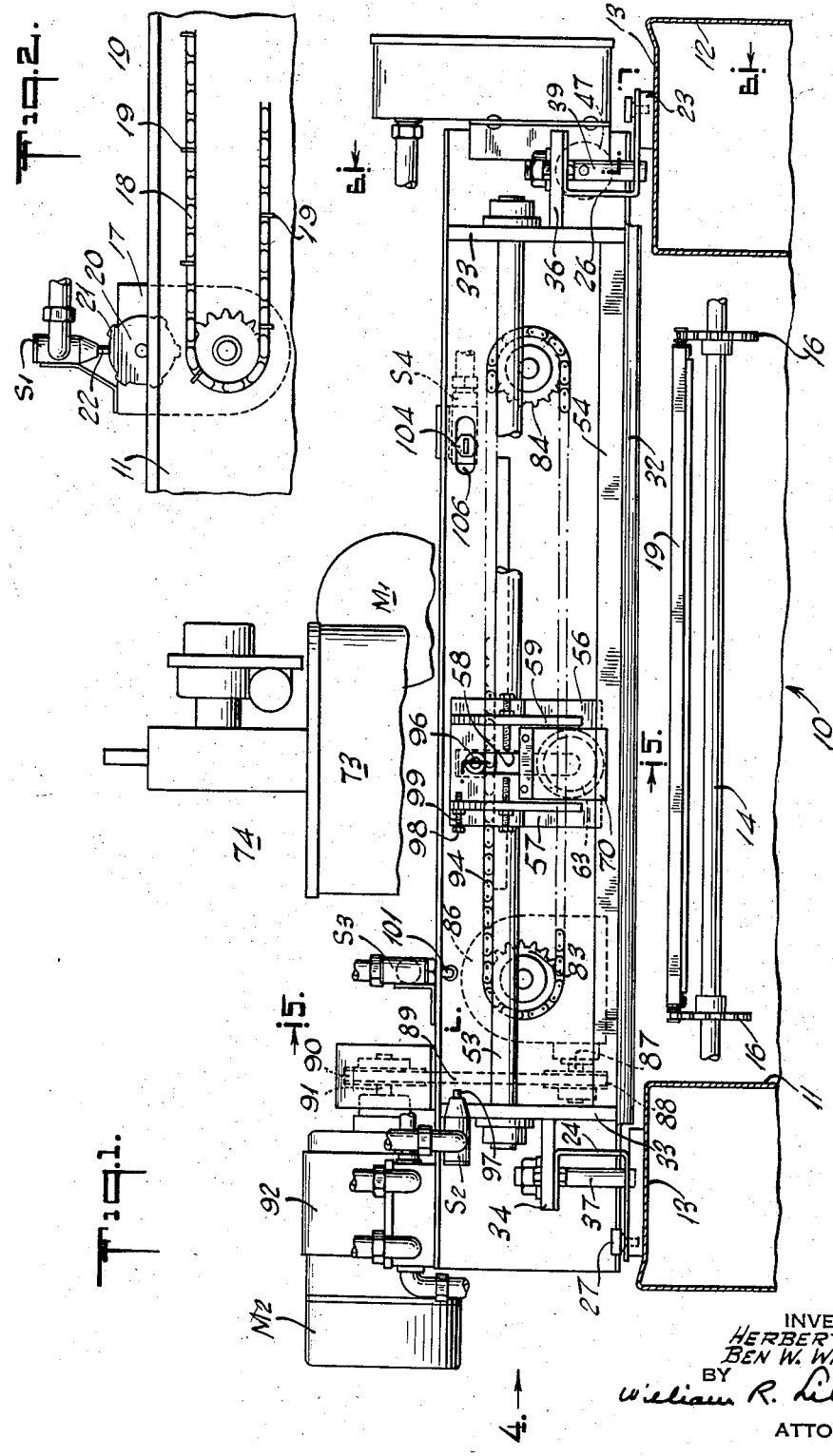
INVENTORS
*HERBERT T. HUNTER*
*BEN W. WILSON*
BY
*William R. Lieberman*
ATTORNEY

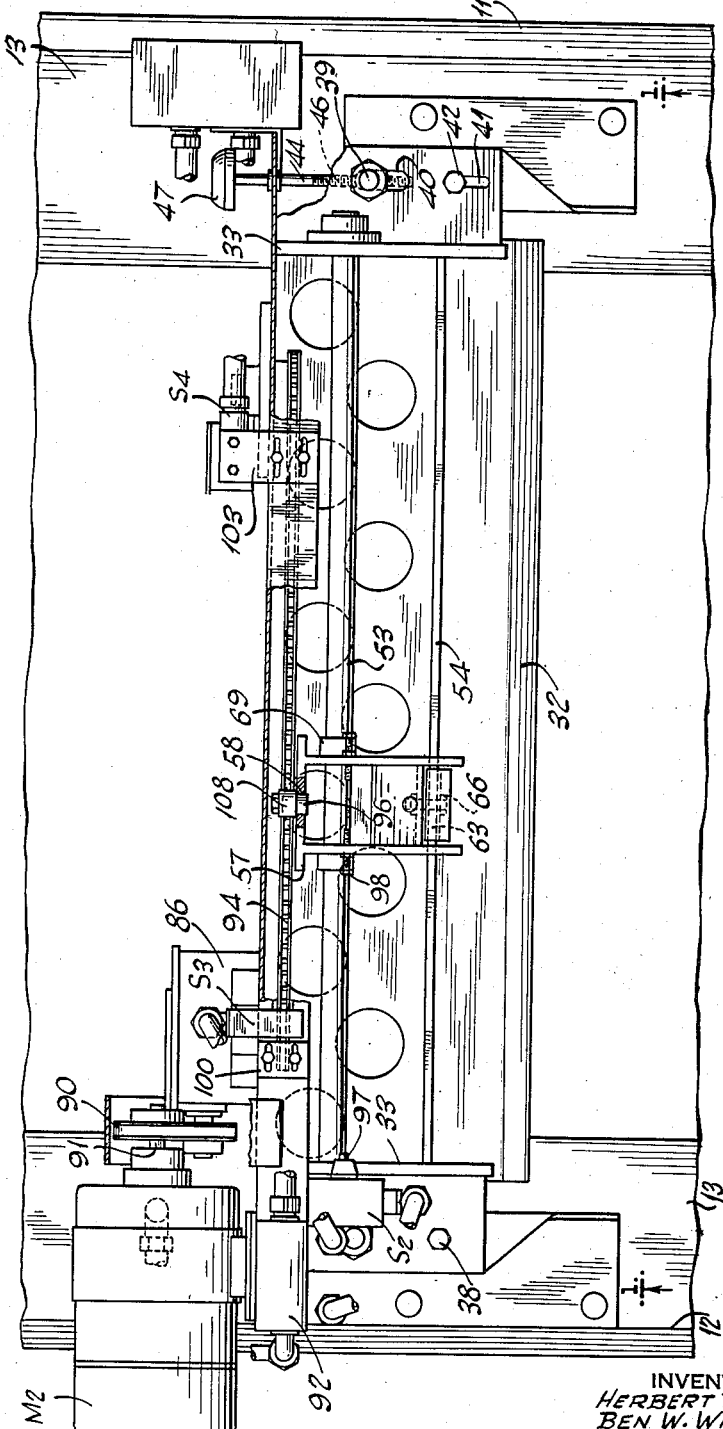

Jan. 6, 1959  H. T. HUNTER ET AL  2,867,162
APPARATUS FOR PRODUCTION OF COOKED PRODUCTS
Filed Jan. 25, 1957  4 Sheets-Sheet 3

INVENTORS
HERBERT T. HUNTER
BEN W. WILSON
BY William R. Lieberman
ATTORNEY

INVENTORS
HERBERT T. HUNTER
BEN W. WILSON
BY
William R. Lieberman
ATTORNEY

United States Patent Office

2,867,162
Patented Jan. 6, 1959.

2,867,162

APPARATUS FOR PRODUCTION OF COOKED PRODUCTS

Herbert T. Hunter, Catonsville, Md., and Ben W. Wilson, Manhasset, N. Y., assignors to DCA Food Industries Inc., New York, N. Y., a corporation of New York Application January 25, 1957, Serial No. 636,369

11 Claims. (Cl. 99—354)

The present invention relates to an improved apparatus for the production of baked products, and it relates more particularly to an improved apparatus for the production of fried cakes.

In the commercial large scale production of fried cakes or similar products such as doughnuts, crullers and the like, the dough is formed into shaped pieces and deposited in a long vat or tank containing a hot oil. The cakes are transported along the tank, inverted and then further transported in the hot oil to the discharge end of the tank where the cooked cakes are removed and further processed. In large scale production, the cakes are transported in parallel rows through the hot oil having been formed either at a position removed from the tank or having been formed directly over the feed end of the tank and dropped directly into the hot oil. In the latter case, the common practice is to employ a plurality of dough forming and cutting nozzles arranged in side-by-side relationship and discharging into the feed end of the cooker tank. The dough forming and cutting apparatus employed is bulky, highly complex and expensive. It is difficult to assemble and disassemble, an operation which is frequently necessary for sanitation purposes. As a result, the equipment is disabled for long periods of time leading to further inefficiencies.

It is, therefore, a principal object of the present invention to provide an improved apparatus for the production of baked products.

Another object of the present invention is to provide an improved apparatus for the production of fried cakes such as doughnuts, crullers, French crullers, and the like.

Still another object of the present invention is to provide, for use with a continuous cake frier, an improved arrangement for the forming and depositing of pieces of shaped dough into said frier in a predetermined arrangement.

Still a further object of the present invention is to provide an improved apparatus for use with a conventional frier for depositing successive regularly spaced rows of shaped pieces of dough into said frier, said apparatus being characterized by its simplicity, ruggedness and ease of assembly and disassembly.

The above and other objects of the present invention will become apparent from a reading of the following description, taken in conjunction with the accompanying drawings, wherein Figure 1 is a front elevational view, partially broken away, of the improved dough forming and cutting apparatus embodying the present invention shown as applied to a continuous frier;

Figure 2 is a side detailed view of a portion of the apparatus;

Figure 3 is a top plan view of the improved apparatus;

Figure 4:
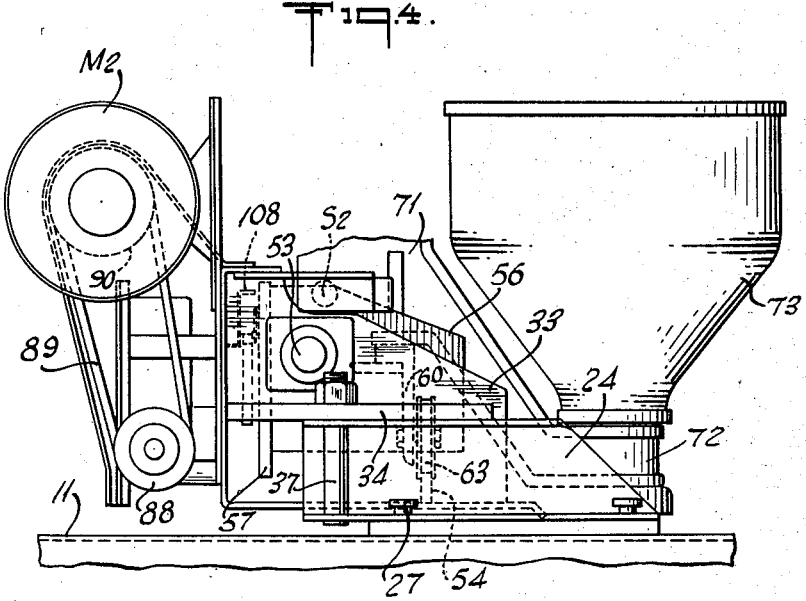
Figure 4 is a side elevational view of the improved apparatus.

In a sense, the present invention contemplates the provision of an improved apparatus for the forming and depositing of pieces of dough comprising a cooker having a longitudinally extending endless conveyor for transporting articles to be cooked therethrough and having a feed end and a discharge end, a dough forming and cutting device, means for periodically actuating said dough cutting and forming device, and means for transporting said dough forming and cutting device along a path transverse to the direction of advance of said conveyor, said path having a component parallel to the direction of advance of the conveyor.

Referring now to the drawings which illustrate a preferred embodiment of the present invention, the numeral 10 generally designates a continuous frier of conventional construction which may be of the type described and illustrated in U. S. Patent No. 2,709,955 granted to H. T. Hunter on June 7, 1955, and includes an elongated open topped vat or tank 11 provided with an upper channel-shaped frame or border 12 having a top wall 13. Located within the tank 11 adjacent the feed end thereof is a transverse shaft 14 having affixed thereto a pair of laterally spaced sprocket wheels 16, one end of the shaft 14 projecting through the side wall of the tank 12 by way of suitable bushings and engaging the output shaft of a speed reduction unit 17, the input shaft of which is connected to a drive motor.

A pair of laterally spaced sprocket chains 18 extend along the length of the tank 11 and engage and are driven by the respective sprocket wheels 16. Carried by and between the link chains 18 are laterally extending, regularly, longitudinally spaced blades or flights 19 which under normal operating conditions extend below and above the surface of the hot oil contained in the frier 10, the spacing between successive flights 19 defining advancing frying cells. The speed reducing unit 17 carries a timing cam 20 which is rotated in synchronism with the shaft 14 and is provided with regularly spaced circumferential projections 21 which correspond to the spacing between successive flights 19 so that as the conveyor advances the distance between successive flights 19, the cam 20 rotates the distance between successive projections 21. A normally open switch S1, whose function will be hereinafter described, is supported above the timing cam 20 and is provided with an arm 22 which engages the cam 20 and which is actuated to close the switch S1 when in registry with a cam projection 21.

Located on the top wall 13 of the frier frame 12 adjacent the feed end thereof are a pair of laterally spaced foot pieces 23 provided with a pair of spaced tapped openings. Disposed on each of the foot pieces 23 are the panel-shaped brackets 24 and 26 respectively, the brackets being removably secured to the foot pieces 23 by means of thumb screws 27 passing through openings in the bases of the brackets 24 and 26 and engaging coresponding tapped openings formed in the foot pieces 23.

Figure 5:
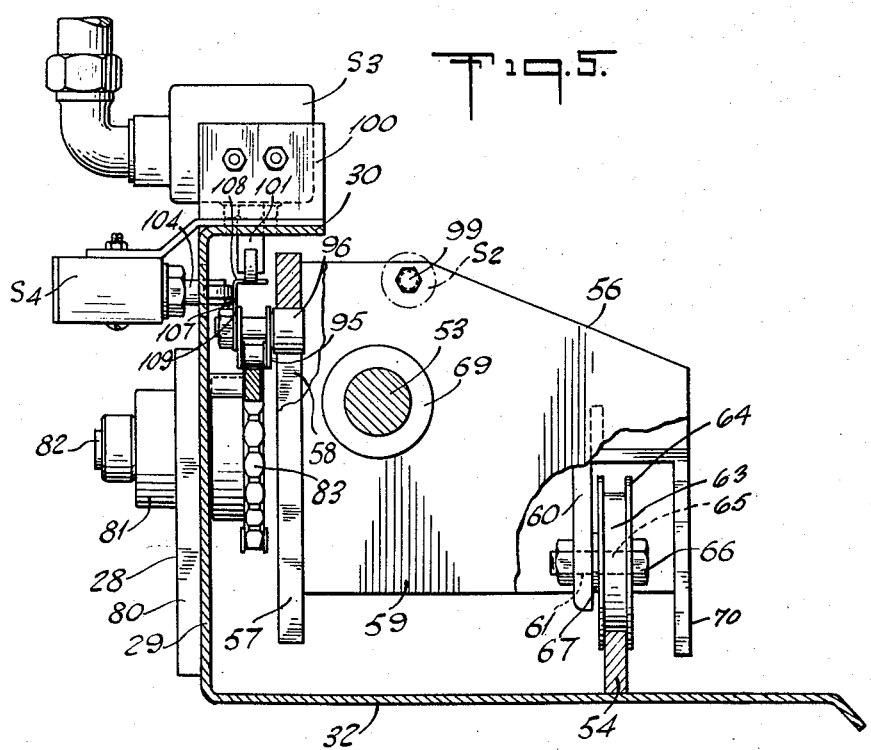
Figure 5 is a sectional view taken along the line 5—5 in Figure 1.

Extending across the frier tank 11 forward of the feed end thereof as illustrated in Figure 5 is a support frame 28 including a vertical wall 29, a rearwardly projecting shelf 30 located along the full upper edge of the vertical wall 29, and a base 32 located along the lower edge of the wall 29 and extending between points short of the ends of the wall 29. A pair of laterally spaced brackets are disposed adjacent opposite ends of the support frame 28 and include vertical heavy side walls 33 having corresponding edges welded or otherwise secured to the support frame rear wall 29, upper shelf 30, and base 32. Horizontal plates 34 and 36 project laterally outwardly from the bracket plate 33 between the upper and lower ends thereof and rest upon the upper walls of the brackets 24 and 26 respectively so that the base 32 of the supporting frame 28 is located above the frier frame upper wall 13.

A vertical stud or pin 37 threaded at its upper end is carried by the bracket 24 and extends through the upper and lower walls thereof and engages a circular opening formed in the bracket plate 34 so that the supporting frame 28 may be swung about the stud or pin 37 to permit the angular adjustment of the supporting frame 28 relative to the longitudinal axis of the frier. A lock washer and nut engage the free threaded end of the stud 37 above the bracket wall 34 to permit the relative locking between the bracket 24 and the bracket plate 34. A nut and bolt arrangement 38 pass through corresponding openings formed in the upper arm of the bracket 24 and the bracket plate 34 at least one of the openings extending laterally to permit the turning of the bracket plate 34 about the stud 37 as illustrated in Figure 3.

Figure 6:
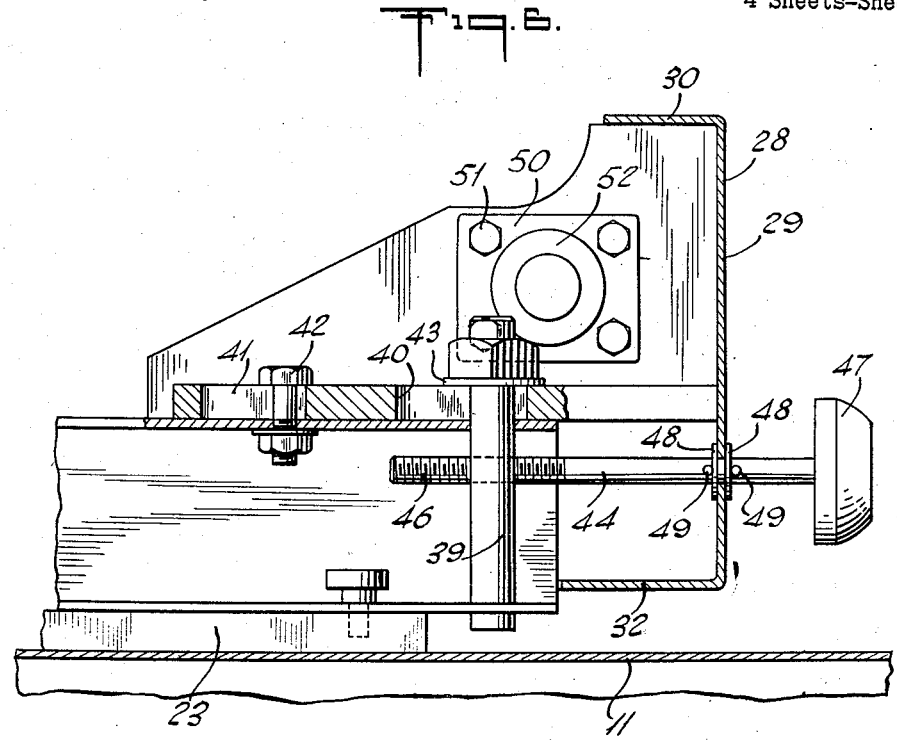
Figure 6 is a sectional view taken along the line 6—6 in Figure 1.

The bracket 26 likewise supports on its upper face a corresponding bracket plate 36 and is provided with a vertically extending stud or pin 39, the upper end of which is threaded and passes through a longitudinally extending slot 40 formed in the bracket plate 36. A second longitudinally extending slot 41 is formed in the bracket plate 36 and is engaged by a bolt 42 carrying a suitable nut and washer, and registers with a corresponding opening in the upper wall of the bracket 26. A nut and lock washer 43 (see Figure 6) engage the threaded end of the stud 39 to permit the releasable locking of the frame 28 in any desired angular position relative to the longitudinal axis of the frier 10.

In order to facilitate the rapid and fine angular adjustment of the frame 28, there is provided a shaft 44 having a threaded end 46 engaging a tapped transverse opening formed in the pin 39. The opposite end of the shaft 44 passes through an opening formed in the support frame vertical wall 29 and terminates in a hand wheel 47. A pair of washers 48 are carried on the shaft 44 and abut opposite faces of the support frame vertical wall 29, the shaft 44 carrying a pair of pins 49 which slidably engage the outside faces of the washers 48. Thus, by loosening the various stud nuts and frame locking bolts, the angular position of the support frame 28 may be adjusted by turning the shaft 44 by way of the hand wheel 47 and the frame may be then locked in position by tightening the respective nuts and bolts.

The bracket vertical plates 33 have aligned openings formed therein and carry on their outer walls bushing members 50 secured in position by suitable bolts 51. The bushing members 50 have collars 52 which engage and rigidly support the opposite ends of a rod 53 of circular cross section which defines a guide rail. A track 54, in the form of a bar of rectangular cross section, extends transversely along the upper face of the frame base 32 parallel to the guide rail 53, as shown in Figures 1 and 5.

A carriage 56 is slidable along the frame 28 and includes a rear wall 57 having a medially located vertical slot 58 formed therein, and a pair of parallel vertical side walls 59 projecting forwardly from and secured to the front face of the wall 57 at points spaced from the side edges of the wall 57. Supported by and between the confronting faces of the carriage side walls 59 at a point rear of the forward edges thereof is a cross bar 60 having a circular opening 61 formed medially above its lower edge. A wheel 63 is provided with a peripheral side flanges 64 and rides along the track 54 which registers with the wheel flanges 64. The wheel 63 is rotatably mounted on the plate 60 by means of a pin 65 which passes through opening 61 and the central opening formed in the wheel 63, the ends of the pin being threaded and engaged by nuts 66 and the wheel 63 being separated from the confronting face of the plate 60 by a suitable spacer 67. The carriage side walls 59 have aligned circular apertures formed therein which register with the guide rail 53 and carry suitable bearings or bushings 69 which slidably engage the guide rail 53. A shield plate 70 is supported between the walls 59 and is provided with a vertical skirt portion which extends for the full length of the wheel 63 and is disposed forwardly thereof.

A bracket 71, as illustrated in Figure 4, is suitably mounted on the carriage 56, its lower end extending forwardly and below the lower forward corners of the carriage plates 59 and terminating in a suitable separable split collar 72 of any well known construction which releasably engages the neck of a dough hopper 73. The hopper 73 forms part of a dough forming and cutting device 74 of any well known type employed in the forming and cutting of dough shapes such as doughnuts and the like.

Figure 7:
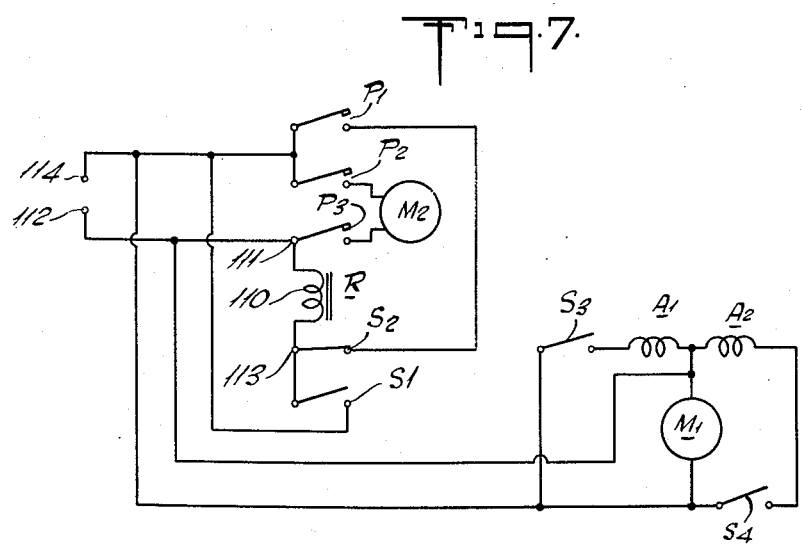
Figure 7 is a schematic view of the circuit network forming a part of the improved apparatus.

The motivating mechanism of the dough forming and cutting device 74 is conventional and includes an electric motor M1 which is connected by way of a speed reducing unit and a well known releasable coupling system such as a disengageable clutch, as shown by the circuit network of Figure 7, to a recycling mechanism which periodically effects the extrusion and cutting of a dough shape. The separable coupling or clutch is actuated by means of a pair of solenoids A1 and A2 to respectively engage or disengage the coupling and whose functioning will be hereinafter described.

As above set forth, except for the solenoid actuation of the clutch or releasable coupling, the dough forming and cutting device 74 is of conventional construction and together with the motivating mechanisms and solenoids A1 and A2 is mounted on the carriage 56.

Mounted on the rear face of the support frame vertical wall 29 are a pair of transversely spaced reinforcing plates 80 which carry bearing supporting collars 81 aligned with corresponding openings formed in the support frame vertical wall 29. Extending through each of the bearing supporting collars 81 and suitably located therein is a rotatable shaft 82 to the inner ends of which are affixed corresponding sprocket wheels 83 and 84 respectively. The sprocket wheel 84 is an idler and the sprocket wheel 83 is coupled by way of the shaft 82 to the output shaft of a suitable speed reducing unit 86 which may be of the variable speed type. The speed reducing unit 86 is provided with an input shaft 87 carrying a pulley 88 preferably of the adjustable diameter type. The pulley 88 is connected by way of a drive belt 89 to a pulley 90 likewise of the adjustable diameter type which is carried by the drive shaft 91 of an electric motor M2. Thus, the speed of the sprocket wheel 83 may be simply adjusted. The motor M2 is mounted on the support frame rear wall 29 by any suitable bracket and strap arrangement 92.

Supported by and between the sprocket wheels 83 and 84 and driven by the sprocket wheel 83 is a sprocket chain 94. A roller 96 is mounted on the sprocket chain 94 by means of a suitable bracket 95 and projects forwardly into sliding registry with the slot 58 formed in the carriage rear wall 57. As a result, upon rotation of the sprocket wheel 83 and advance of the sprocket chain 94, the carriage 56 and the supported dough extruding and forming device 74 are transported forwardly and rearwardly along the support frame 28 in successive advance and return strokes.

A normally closed stop switch is carried on the underface of the support frame upper shelf 30 above the bracket 24 and is provided with an actuating plunger 97 which is in alignment with the head 98 of a bolt 99 carried by the carriage side wall 59. The bolt head 98 engages the switch plunger 97 when the carriage 56 reaches the terminus of its return stroke to effect the opening of the switch S2. As illustrated in the drawing, the longitudinal position of the bolt head 98 is adjustable.

In order to effect the actuation and deactuation of the dough forming and cutting mechanism 74, there is provided a pair of normally open switches S3 and S4. The switch S3 is mounted by means of a slidably adjustable bracket 100 on the top shelf 30 of the support frame 28 above approximately the axis of the sprocket wheel 83. A roller carrying, switch actuating plunger 101 depends from the switch S3 through a longitudinal slot formed in the frame wall 30 to a point below the underface thereof. The switch S4 is carried on the underface of a plate 103 slidably adjustably mounted on the support frame upper wall 30, the switch S4 having a roller carrying, switch actuating plunger 104 passing rearwardly through a slot 106 formed in the support frame vertical wall 29. Mounted on the roller bracket 95 carried by the sprocket chain 94 is a switch tripping element 107 having a top wall 108 whose path carries it into engagement with the plunger 101 of the switch S3 to effect the closing of the switch S3 and a vertical wall 109 whose path carries it into engagement with the plunger 104 of the switch S4 to effect the closing of the switch S4. Thus, the switch S3 is momentarily closed at the start of the forward stroke of the carriage 56 and the switch S4 is momentarily closed as the carriage 56 approaches the end of its forward stroke.

Referring now to Figure 7 of the drawing, which illustrates the circuit network of the improved device, there is provided a relay R having associated therewith normally open contacts P1, P2 and P3 which are closed upon energization of the solenoid 110 of the relay R. A terminal 111 of the relay solenoid 110 is connected to a terminal 112 of a suitable source of current and to the contact of the switch S1 and to the armature contact of the relay contacts P3. The other terminal 113 of the relay solenoid 110 is connected to the normally closed arm of the switch S2 and the normally open arm of the switch S1. The other terminal 114 of the source of current is connected to the armature contacts of the relay contacts P1 and P2, the arms of the switches S3 and S4, and one pole of the motor M1, the other pole of which is connected to the current contact 112. The stationary relay contact P1 is connected to the contact of the switch S2 and the stationary relay contacts P2 and P3 are connected to the motor M2. There are provided a pair of armature actuating solenoids A1 and A2 which act in opposition.

As aforesaid, when the solenoid A1 is energized, the coupling mechanism associated with the dough forming and cutting device 74 is brought into engaged position to actuate the dough forming and cutting device and is maintained in such actuation even though the solenoid A1 is deenergized. However, upon deenergization of the solenoid A1 and the energization of the solenoid A2, the coupling mechanism is disengaged to thereby deactuate the dough forming and cutting device. One pole of each of the solenoids A1 and A2 are connected to the pole 112 of the source of current, the other pole of the solenoid A1 being connected to the contact of the switch S3 and the other pole of the solenoid A2 being connected to the contact of the switch S4.

Considering now the operation of the improved apparatus, the trough 11 is filled with oil to the proper level and the oil is heated to the desired cooking temperature. The conveyor drive is energized to transport the flights 19 along the length of the trough and to rotate the timing cam 20. The speed of the carriage 56 is adjusted as aforesaid, by adjusting the speed of the sprocket chain 94 so that the spacing along each row between the successive pieces of dough dropped by the dough forming and cutting mechanism is of the desired distance.

The various frame securing nuts and bolts are loosened and the angle of the support frame 28 and hence the path of the dough forming and cutting device is adjusted by turning the hand wheel 47 so that as the dough forming and cutting device progresses along its advance stroke it will be a substantially constant predetermined distance from a corresponding flight 19 and the pieces of dough dropped by the dough forming and cutting mechanism 74 will fall directly within the corresponding cell defined by a pair of successive flights. Upon the frame being adjusted to the desired angle, the various nuts and bolts are tightened to secure the frame in such position. The dough hopper 73 is then filled and the operation of the apparatus commences.

When one of the flights 19 is in proper position relative to the discharge outlet, the carriage 56 and the dough forming and cutting mechanism 74 are at the beginning of their forward stroke which is the leftmost position as illustrated in Figures 1 and 3 of the drawing. As a flight 19 reaches the desired position relative to the discharge opening of the dough forming and cutting device 74, a raised portion 21 of the timing cam 20 engages the actuating plunger 22 of the switch S1 to normally close the switch S1 thereby energizing the relay solenoid 110 and effect the closing of the relay contacts P1, P2 and P3. The closing of the contacts P2 and P3 energizes the motor M2 to thereby rotate the sprocket wheel 83 and advance the carriage 56 and the dough forming and cutting mechanism 74 along its forward stroke. The closing of the contacts P1 which define relay hold contacts connects the relay solenoid 110 by way of the normally closed switch S2 to the source of current to thereby maintain the solenoid 110 energized and the contacts P1, P2 and P3 in closed position. As the carriage 56 advances the tripping element 107 effects the momentary closing of the switch S3 to energize the relay A1 and cause the engagement of the drive clutch or coupling device of the dough forming and cutting mechanism 74 to actuate the latter which extrudes, forms and cuts the dough and drops and deposits successive pieces of dough into the cooking cells in a manner well known.

The positions of the successive pieces of dough in the respective cooking cell is optimumly arranged in the manner previously described. As the carriage 56 approaches the end of its forward stroke, the tripping mechanism 107 momentarily closes the switch S4 to energize the solenoid A2 and effect the deactuation of the dough forming and cutting device 74. The carriage 56 is then transported along its return stroke until the screw head 99 engages the actuating plunger of the switch S2 to momentarily open the switch S2 and the circuit of the relay solenoid 110 thereby deenergizing the relay solenoid 110 and permitting the relay contacts P1, P2 and P3 to return to their open position, motor M2 being consequently deenergized and the carriage 56 brought to rest. Upon the next successive raised surface 21 of the cam 20 engaging the plunger 22 of the switch S1, the cycle is again repeated. It should be noted that whereas the cycle is initiated by means of a timing cam 20, the switch S2 may be actuated in other manners, for example, the plunger 22 of the switch S1 may be located in the path of the flights 19 and there actuated by the successive flights.

While there has been described and illustrated a preferred embodiment of the present invention, it is apparent that numerous alterations and omissions may be made without departing from the spirit thereof.

We claim:

1. An improved apparatus for the production of a cooked product comprising a cooking device, a conveyor longitudinally substantially continuously movable through said cooking device, a mechanism for forming and cutting dough into pieces of predetermined shape, said mechanism having a discharge opening disposed above said conveyor, and means for reciprocating said dough forming and cutting mechanism in a forward and return stroke along a transverse path across the direction of advance of said conveyor said path having a longitudinal component in the direction of advance of said conveyor, the longitudinal component of the speed of said dough forming and cutting mechanism during its forward stroke along said transverse path being substantially equal to the speed of said conveyor.

2. An improved apparatus in accordance with claim 1, wherein said conveyor includes a plurality of longitudinally spaced, transversely extending parallel flights, the space between successive flights defining advancing cooking cells, said cut pieces of dough being deposited in parallel rows in successive cells.

3. An improved apparatus in accordance with claim 2, including means for halting the movement of said dough forming and cutting mechanism across said conveyor upon completion of said return stroke and means for initiating the movement of said dough forming and cutting mechanism upon said flights reaching a predetermined position.

4. An improved apparatus in accordance with claim 1, including means for adjusting the angle of said path of said dough cutting and forming mechanism relative to the direction of movement of said conveyor.

5. An improved apparatus in accordance with claim 1, including means for varying the speed of movement of said dough cutting and forming mechanism along said path.

6. An improved apparatus in accordance with claim 1, including means for actuating and deactuating said dough forming and cutting mechanism, said means being responsive to the position of said mechanism along its path of movement.

7. An improved apparatus for the production of fried cakes comprising an elongated trough adapted to contain a cooking oil and having a feed end and a discharge end, a plurality of regularly, longitudinally spaced, parallel, transverse flights disposed in said trough, the spaces between successive flights defining cooking cells, means for substantially continuously advancing said flights along a longitudinal direction from the feed end toward the discharge end of said trough, a track disposed adjacent to the feed end of said trough extending transversely across said trough at an acute, horizontal angle to said flights, said track having a longitudinal component, a carriage, means for transporting said carriage along said track in a forward and return stroke and a dough forming and cutting mechanism mounted on and movable with said carriage, said mechanism having a discharge outlet disposed above the feed end of said trough, the longitudinal component of speed of said carriage along said forward stroke being substantially equal to the speed of advance of said flights.

8. An improved apparatus in accordance with claim 7, including means for adjusting the angle of said track relative to said flights whereby to vary the longitudinal component of speed of said carriage.

9. An improved apparatus in accordance with claim 7, including means for initiating the movement of said carriage along its forward stroke upon said flights reaching a predetermined position, and means for halting said carriage at the end of its return stroke.

10. An improved apparatus in accordance with claim 7, including means responsive to the position of said carriage for actuating and deactuating said dough forming and cutting mechanism.

11. An improved apparatus in accordance with claim 7, wherein said carriage transporting means includes an endless sprocket chain extending parallel to said track, a pair of sprocket wheels supporting and engaging said sprocket chain, means for rotating one of said sprocket wheels and a coupling element connecting said sprocket chain to said carriage.

References Cited in the file of this patent

UNITED STATES PATENTS 2,032,468    Carpenter  _____ Mar. 3, 1936